(12) United States Patent
Ketchel et al.

(10) Patent No.: US 9,028,332 B2
(45) Date of Patent: May 12, 2015

(54) PROPELLER SHAFT ASSEMBLY WITH GREASE RETENTION AND VENT CAP

(75) Inventors: Bradley Ketchel, Waterford, MI (US);
Chris Katke, Redford, MI (US);
Kristyn Dougherty, Milford, MI (US);
Krystil Edwards, Livonia, MI (US)

(73) Assignee: NTN Bearing Corporation of America, Mt. Prospect, IL (US)

( * ) Notice: Subject to any disclaimer, the term of this patent is extended or adjusted under 35 U.S.C. 154(b) by 75 days.

(21) Appl. No.: 13/885,563

(22) PCT Filed: Nov. 16, 2011

(86) PCT No.: PCT/US2011/060948
§ 371 (c)(1),
(2), (4) Date: Dec. 20, 2013

(87) PCT Pub. No.: WO2012/068225
PCT Pub. Date: May 24, 2012

(65) Prior Publication Data
US 2014/0206464 A1 Jul. 24, 2014

Related U.S. Application Data

(60) Provisional application No. 61/414,222, filed on Nov. 16, 2010.

(51) Int. Cl.
*F16D 3/227* (2006.01)
*F16D 3/84* (2006.01)

(52) U.S. Cl.
CPC ............... *F16D 3/843* (2013.01); *F16D 3/227* (2013.01); *F16D 3/84* (2013.01); *F16D 2300/06* (2013.01); *Y10S 464/906* (2013.01); *Y10S 277/928* (2013.01)

(58) Field of Classification Search
CPC ........... F16D 3/227; F16D 3/84; F16D 3/843; F16D 2300/06
USPC .............. 464/15, 17, 146, 167, 904–906; 280/777; 277/928; 220/DIG. 19; 137/859
See application file for complete search history.

(56) References Cited

U.S. PATENT DOCUMENTS

| | | | |
|---|---|---|---|
| 965,255 A * | 7/1910 | Trapp et al. ................. 277/928 |
| 2,994,731 A | 8/1961 | Buskirk et al. | |
| 3,596,808 A * | 8/1971 | Corsette ..................... 137/859 X |
| 6,530,843 B2 * | 3/2003 | Miller et al. .............. 464/15 X |
| 6,981,919 B2 | 1/2006 | Sugiyama et al. | |
| 6,988,949 B2 | 1/2006 | Wang | |
| 7,226,360 B2 | 6/2007 | Lyon et al. | |
| 7,278,894 B2 * | 10/2007 | Lyon et al. ............... 464/146 X |
| 7,297,067 B1 | 11/2007 | Meyer | |
| 7,967,686 B2 * | 6/2011 | Frost et al. .................. 464/146 |
| 2005/0130751 A1 * | 6/2005 | Kuczera et al. ............. 464/146 |
| 2011/0077091 A1 * | 3/2011 | Terada et al. ............... 464/146 |

* cited by examiner

*Primary Examiner* — Gregory Binda
(74) *Attorney, Agent, or Firm* — Brinks, Gilson & Lione

(57) ABSTRACT

A cap acting as a grease retention feature and venting system allows crash optimization of a propeller shaft with a plunging constant velocity joint. The cap is located between a constant velocity joint and a tube of the propeller shaft system. The cap includes: a rim sealed against the inner diameter of the constant velocity joint, an interior vent chamber, a vent hole facing the interior components of the constant velocity joint and leading to the vent chamber, and an annular radial groove along the entire circumference connected to the vent chamber. The outer race has a hole perpendicular to the joint axis to complete venting to the atmosphere. In the event of a vehicle crash, the constant velocity internal joint components contact the device, causing the device to dislodge from its fixed position, contact the friction weld curls and fracture at a determined load.

10 Claims, 6 Drawing Sheets

PROPELLER SHAFT ASSEMBLY WITH GREASE RETENTION AND VENT CAP

TECHNICAL FIELD OF THE INVENTION

The present invention relates to a motor vehicle propeller shaft assembly and a constant velocity joint (CVJ) cap of such an assembly.

BACKGROUND OF THE INVENTION

For safety reasons, propeller shaft assemblies for motor vehicles which are oriented longitudinally with constant velocity joints are typically designed with a shock absorption capability during telescopically collapse of the shaft assembly in the event of a frontal impact. These assemblies also need proper sealing against lubricant leakage on the one hand and a venting system on the other hand. All these requirements make the construction of a propeller shaft assembly complex.

SUMMARY OF THE INVENTION

The present invention simplifies the propeller shaft assembly by providing a cap inserted into or abutting the outer race of a constant velocity joint (CVJ) that enables both proper sealing and venting without interfering with the energy absorption capability of the assembly.

The grease retention and vent cap of this invention may enable a collapse of the propeller shaft assembly in various ways. In a first example, the grease retention and vent cap has a rim pressed into or adjacent the outer race of the CVJ which stays rigid during a vehicle crash. If the propeller shaft is fabricated with a beaded weld which projects into the inside diameter of the shaft, this rim may be retained or broken by the weld bead during a crash. Internal CVJ components abut a central portion of the cap and cause this central portion to break away from the cap rim and pass through the tubular propeller shaft ahead of the internal joint components, allowing the propeller shaft assembly to collapse telescopically.

Alternatively, the entire rim of the cap can disintegrate into pieces small enough to enter the tubular propeller shaft.

For applications for a propeller shaft which does not have an inwardly protruding weld bead, the entire cap may be pushed into the tubular propeller shaft without breaking. The cap has an arrangement of vent ducts leading from the internal components of the CVJ to a radial annular groove surrounding the entire circumference of the cap. From there, a connection to the atmosphere is established by radial bores in the outer race of the CVJ in the axial area of the annular groove at any angular position on the tubular shaft. The invention thus encompasses both a venting system incorporated into the cap and a crash feature for a propeller shaft assembly, eliminating the need for two separate systems for such features.

Grease is retained inside the outer race of the CVJ in the propeller shaft assembly by providing a vent hole for communication with the interior components of the CVJ in the axial center of the cap, thereby ensuring that the vent hole is never at the bottom of the tubular shaft, regardless of the orientation of the cap. The rim thus forms a seal along the entire circumference of the cap.

In this configuration, the cap will act as a venting system, provides grease retention for the CVJ, and allows for crash optimization.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE INVENTION

The figures of the drawings are provided for purely illustrative purposes and are not intended to limit the scope of the invention.

Figure 1:
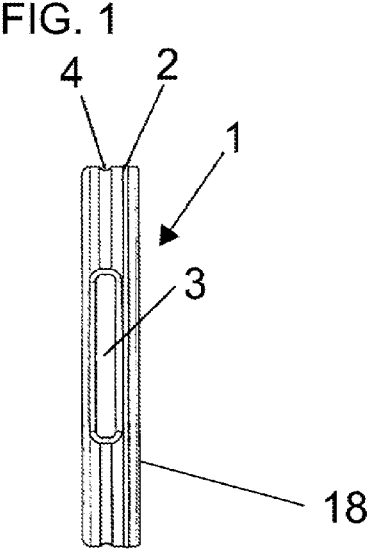
FIG. 1 depicts a side view of a first illustrative example of a cap in accordance with this invention.
Figure 2:
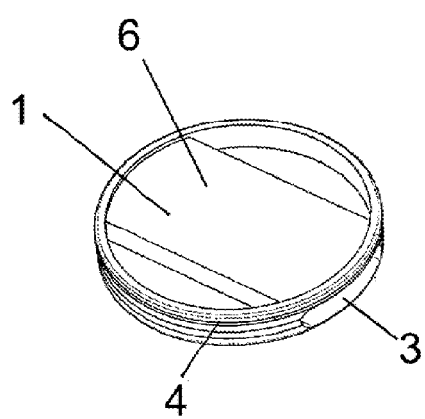
FIG. 2 depicts the cap of FIG. 1 in a first perspective view showing one of two major surfaces of the cap.
Figure 3:
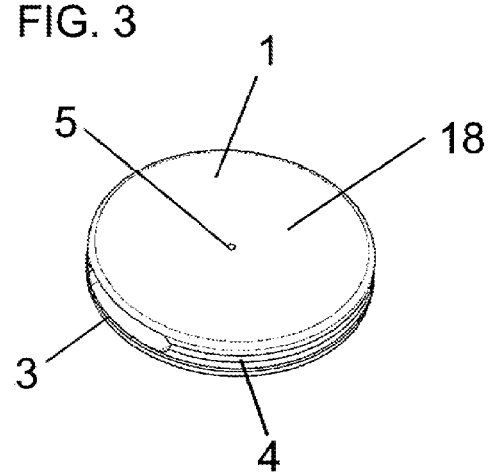
FIG. 3 depicts the cap of FIG. 1 in a second perspective view showing the other one of the two major surfaces of the cap.

Referring to FIGS. 1 through 3, a first exemplary embodiment of a grease retention and vent cap 1 has a rim 2 dimensioned to be placed and retained in an outer race 9 of a CVJ. As shown, CVJ has a counter-bored region for receiving cap 1. Other embodiments (not shown) can provide an inside diameter surface for retaining cap 1 adjacent to the CVJ. Retaining the rim 2 in the outer race 9 may be accomplished by a slight radial annular indent placed on a corresponding annular protrusion in the outer race 9.

Axially adjacent to the rim 2 is an axial area forming a hollow chamber 3 that extends radially across the entire width of the cap 1. The hollow chamber 3 is open at both radial ends and terminates in an annular groove 4 that extends around the entire circumference of the cap 1. An axial vent hole 5 is located centrally in cap wall 18 that bounds the hollow chamber 3 at an axial end opposite the rim 2. The vent hole 5 establishes fluid communication of the hollow space 3 to the outside of the cap 1.

Figure 4:
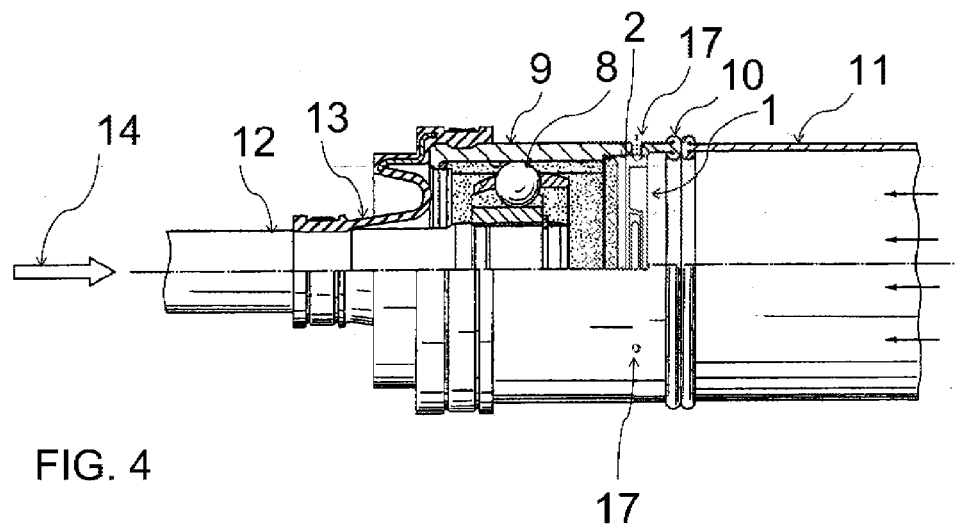
FIG. 4 is a longitudinal cross-sectional view of a propeller shaft assembly according to this invention showing the components thereof during normal vehicle operation.

Referring now to FIG. 4, the cap 1 is pressed into a recessed inside diameter portion of the outer race 9 of a propeller shaft CVJ and retained at its outer diameter by rim 2. The cap 1 separates internal components of a CVJ, such as a stub shaft 12, an inner race, a cage and balls (known as the internal joint components and referred to by reference number 8) from a tubular shaft portion 11 of the propeller shaft. A dust boot 13 seals the gap between the stub shaft 12 and the outer race 9 to prevent contamination. Air is allowed to pass from the internal components 8 of the CVJ to the cap hollow chamber 3 through the vent hole 5, which is centrally located in the cap 1 and extends axially through a face of the cap 1 into the hollow chamber 3. This allows atmospheric pressure venting which prevents the development of pressure differentials between the area of the joint internals 8 and atmosphere, which can lead to the introduction of contaminants which can degrade the service life of the CVJ.

The vent hole 5 is located on a major face of the cap wall 18 and oriented to face the internal CVJ components 8. Air is then allowed to pass from the hollow air chamber 3 of the cap 1 through the radially open ends of the hollow chamber 3 into the radial annular groove 4 that runs 360 degrees around the outer periphery of the cap 1. The air then passes through bores 17 drilled into the outer race 9 of the CVJ to the atmosphere.

The hollow air chamber 3 in the cap 1 has a cavity volume which ensures that the propeller shaft CVJ does not allow water ingress during an event in which the CVJ is hot and then cooled quickly, for example by water submersion during operation of the associated motor vehicle. In such a situation, the rapid quenching can cause water to be sucked into the cap 1. By providing sufficient volume in the internal hollow chamber 3 of the cap 1, the sucked-in water will be retained in the hollow chamber 3 and will not reach the internal joint components 8 through vent hole 5. The exact volume of the hollow chamber 3 depends on anticipated temperature differences and on physical properties of the propeller shaft assembly, such as enclosed air volume. The central location of vent hole 5 ensures that the vent hole 5 is never at the bottom of the hollow chamber, regardless of the angular orientation of the cap 1 inside the propeller shaft assembly. Therefore, any water accumulated at the bottom of the hollow chamber 3 cannot flow into the area of the internal joint components 8.

The tubular shaft 11 of the propeller shaft assembly is connected to the outer race 9 via a weld 10. The weld 10 as shown, has a bead which extends both radially outwardly, and also inwardly from the inside diameter of shaft 11, which is typical in a friction welding process. To not interfere with axial movement of a cap, machining of the bead of weld 10 would be required. In order to still allow for a telescopic collapse during a frontal impact without interior machining of the weld 10, the cap 1 is configured to withstand axial displacement of the internal joint components 8 in direction 14 only to a limited extent. Upon a vehicle crash exceeding such displacement, the rim 2 of the cap 1 are retained inside the CVJ outer race 9. A central portion 6 of the cap 1 shears away, separating from the rim 2, and allows the internal joint components 8 to escape from the outer race 9 into the tubular shaft 11.

The cap 1 is made of a material, for instance a suitable plastic material, that is tunable to collapse at a certain energy produced by the vehicle during a crash. The exact energy and resulting force to trigger a separation of the central portion 6 from the rim 2 can be empirically determined and depends on several factors that may include vehicle weight and spatial dimensions inside the vehicle.

FIG. 4 depicts the cap 1 used within a propeller shaft system during normal vehicle operation. The cap 1 is pressed inside the outer race 9. The internal joint components 8 are retained and sealed by the cap 1. Grease is retained within the outer race 9 by the cap 1. The air vent bores 17 in the outer race 9 allow venting from the internal joint components 8 through the axial vent hole 5, via the hollow chamber 3 and the bores 17 to the atmosphere.

Figure 5:
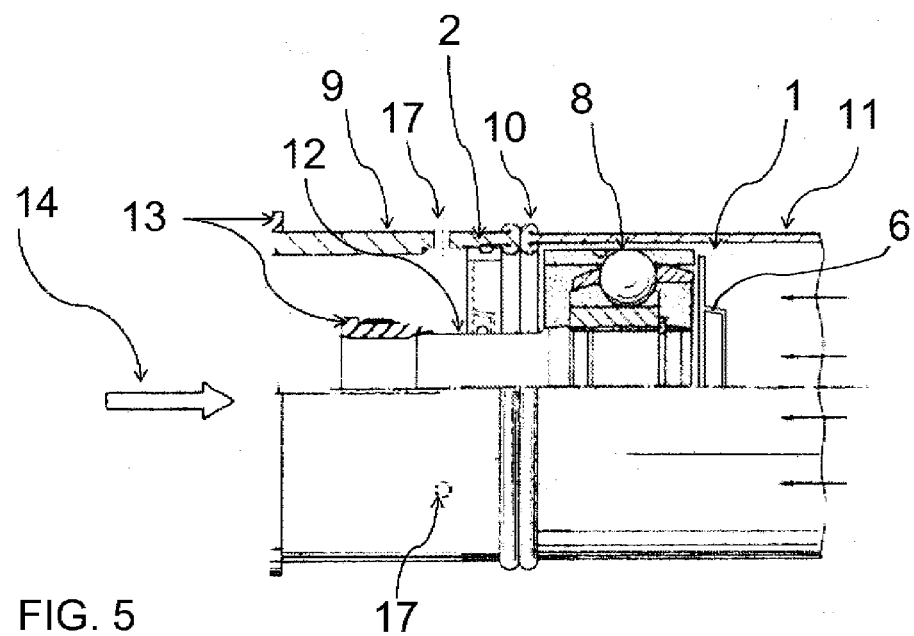
FIG. 5 is a longitudinal cross-sectional view of a propeller shaft assembly according to this invention showing the components thereof following a vehicle crash.

FIG. 5 depicts the cap 1 used within a propeller shaft system during a vehicle crash. During the impact, forces acting on the vehicle transmission shift the stub shaft 12, producing displacement in the direction shown by the arrow 14. The internal joint components 8 impact the cap 1, forcing the cap toward the tubular shaft 11 until the rim 2, acting as a low force retention feature, contacts the interior bead of the weld 10. The rim 2 remains in contact with the weld 10, while the impact causes the central portion 6 of the cap 1 to shear and break away. The central portion 6 exits the outer race 9 ahead of the internal joint components 8 and enters the tubular shaft 11, giving way for the internal joint components 8 to follow.

The internal joint components 8 are small enough to pass from the outer race 9 through the tubular propeller shaft 11 following a backward shift of an engine or transmission during a vehicle collision, to absorb the energy created by the vehicle collision, thereby enabling the telescopic effect described earlier.

The cap 1 may be used in a propeller shaft which uses either a friction weld, gas metal arc weld or magnetic arc weld to join the CVJ outer race 9 to the tubular propeller shaft 11. With the use of a friction weld 10, during a collision, the cap 1 contacts the internal bead of the weld 10 and the central portion 6 of the cap 1 is sheared away from the rim portion 2 as described above.

With the use of either a gas metal arc weld or magnetic arc weld forming a smooth surface at the inner tube diameter, the cap 1 may be made with a diameter small enough such that it is able to pass through the weld portion and into the tubular propeller shaft 11. Accordingly, absent an interior weld bead, the grease retention and vent cap 1 remains intact during the collision. In the drawings, the cap 1 of FIG. 4 would simply move to the right as a whole, ahead of the internal CVJ components, without shearing of the cap.

Referring now to FIGS. 6 through 9 showing an alternative embodiment of cap 101, axes x, y, and z of a virtual coordinate system are indicated in the drawings to illustrate the respective perspectives of the individual drawing figures. In a second exemplary embodiment of the present invention, a grease retention and vent cap 101 has a rim 102 dimensioned to be placed and retained in an outer race 109 of a CVJ. Retaining the rim 102 in the outer race 109 may be accomplished by a slight radial annular indent or expansion matched with a corresponding annular shape in the outer race 109.

Axially adjacent to the rim 102 is an axial area forming a plurality of hollow channels 103 that extend parallel across the entire radial width of the cap 101. The hollow channels 103 are separated by parallel walls 107 arranged in such a way that the radial center of the cap 101 is not obstructed by a wall 107. The hollow channels 103 are open at both radial ends. A radial annular groove 104 in end portions of the walls 107 extends around the entire circumference of the cap 101. An axial vent hole 105 is located centrally in a radially extending wall 118 that bounds the hollow channels 103 at an axial end opposite the rim 102. The vent hole 105 establishes an axial communication of that one of the hollow channels 103 that extends across the central location to the axial outside of the cap 101.

Figure 6:
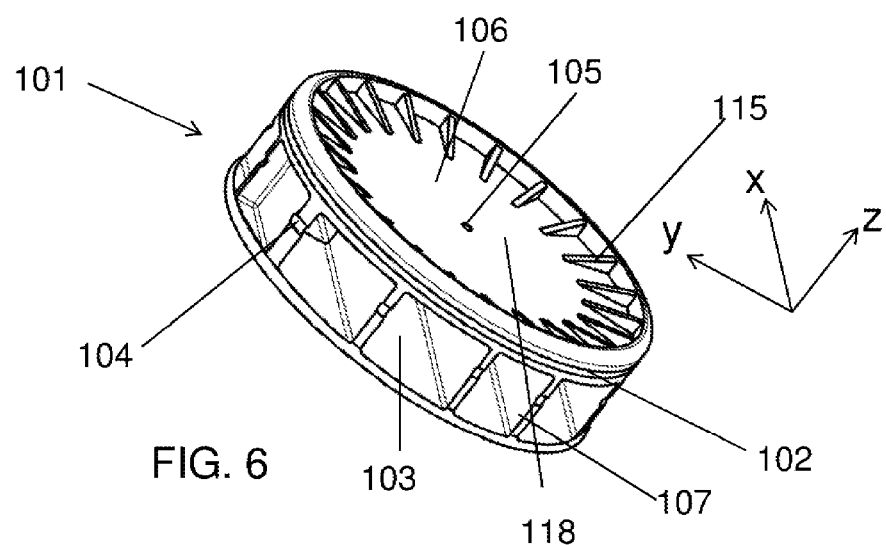
FIG. 6 depicts a first perspective view of a grease retention and vent cap according to a second exemplary embodiment of the invention.
Figure 7:
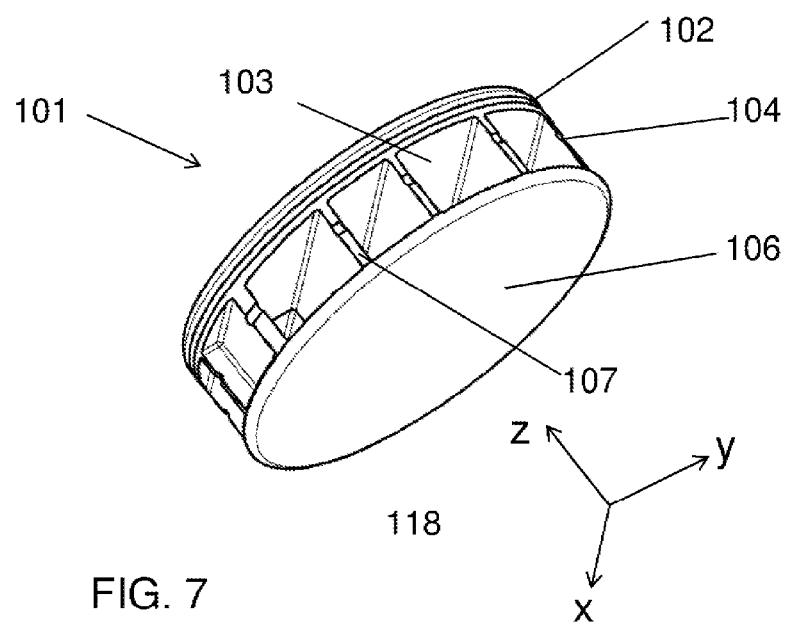
FIG. 7 depicts a second perspective view of the grease retention and vent cap of FIG. 6.
Figure 8:
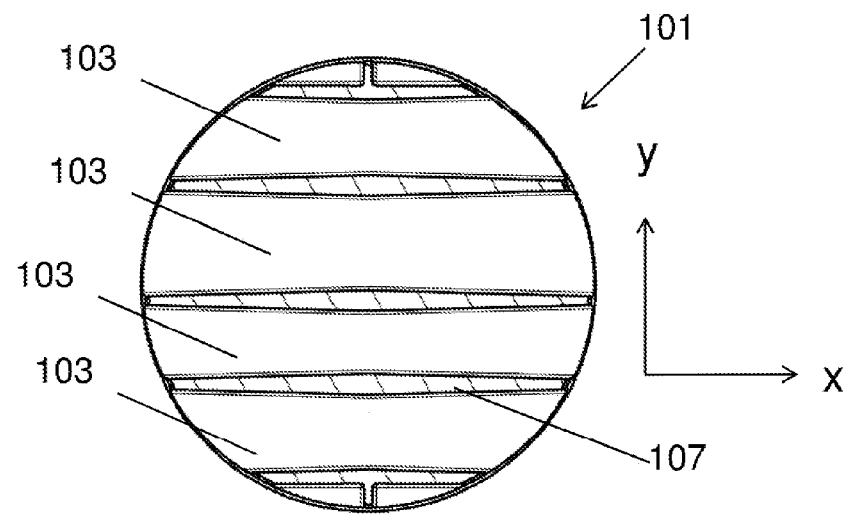
FIG. 8 depicts a cross-sectional view of the venting system in the grease retention and vent cap of FIG. 6.
Figure 9:
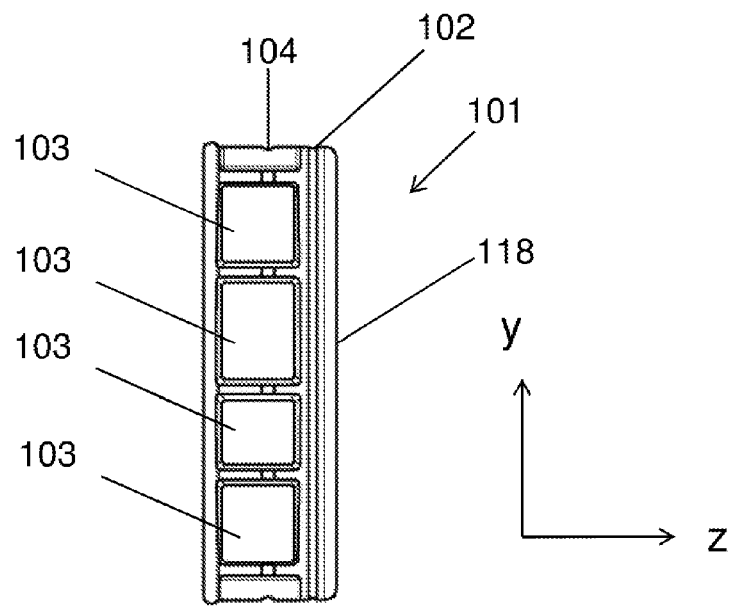
FIG. 9 depicts a side view on the grease retention and vent cap of FIG. 6
Figure 11:
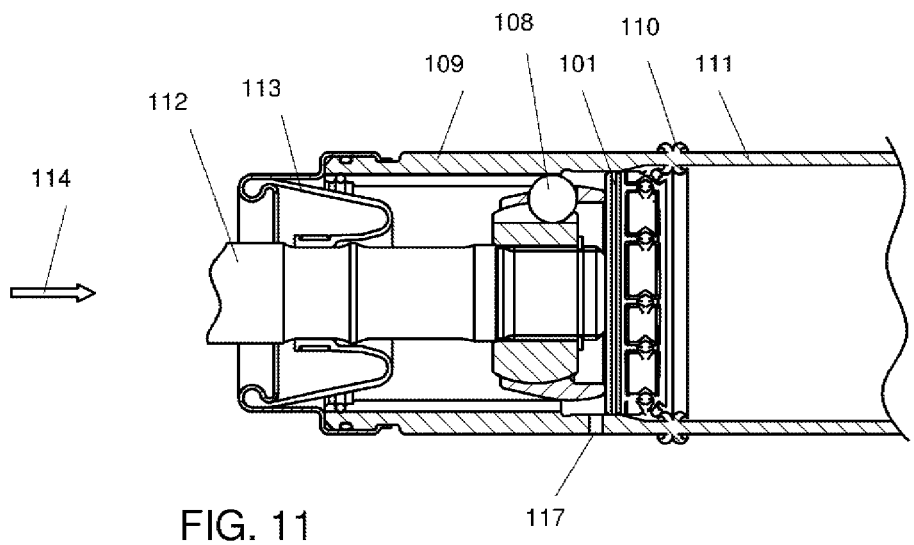
FIG. 11 depicts the grease retention and vent cap of FIG. 6 within a propeller shaft system during a vehicle crash.
Figure 12:
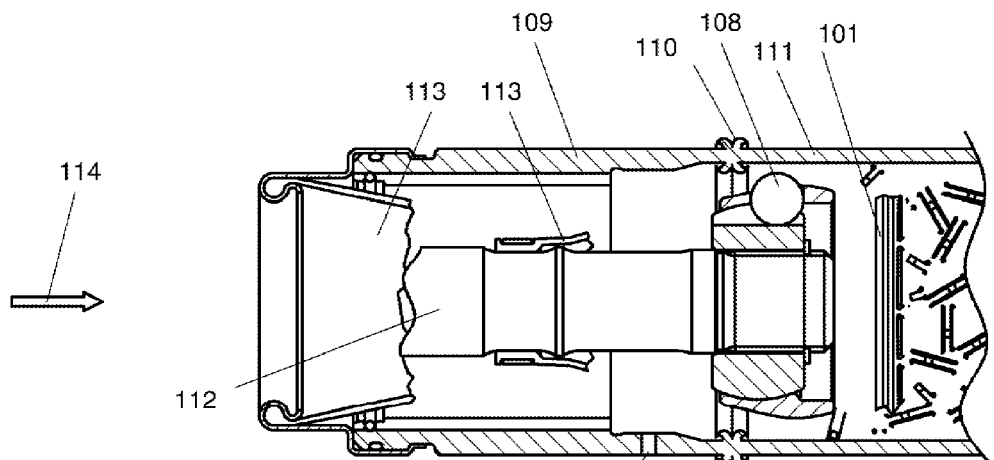
FIG. 12 depicts the grease retention and vent cap of FIG. 6 within a first propeller shaft system after a vehicle crash.

FIG. 6 shows optional reinforcing webs 115 supporting the rim 102, the thickness as well as radial and axial dimensions of these webs 115 can be dimensioned to meet specifications regarding a threshold force along the arrow 114 (shown in subsequent figures) required to separate the rim 102 from the central portion 106 of the cap 101 or to disintegrate the rim as explained in more detail in connection with FIGS. 10 through 12.

Figure 10:
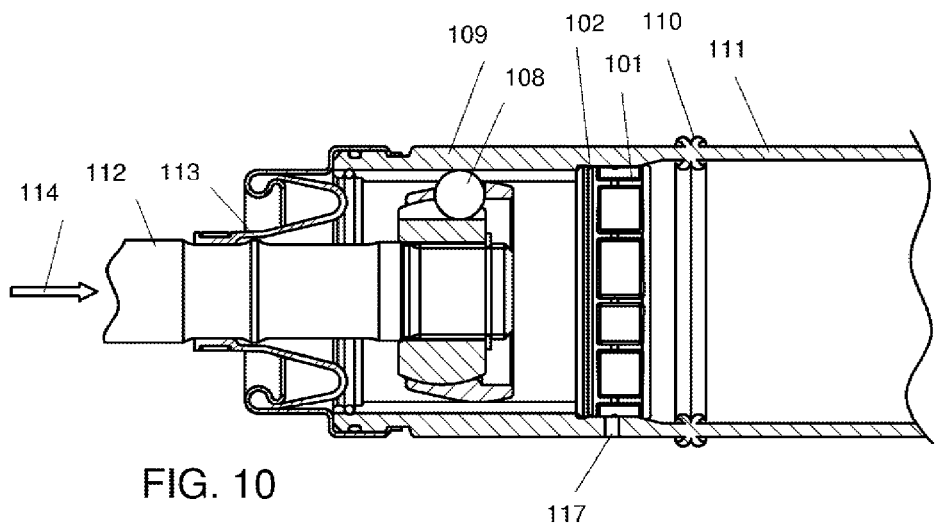
FIG. 10 depicts the grease retention and vent cap of FIG. 6 within a propeller shaft system during normal vehicle operation.

Referring now to FIG. 10, the cap 101 is pressed into the outer race 109 of a propeller shaft CVJ and retained at its outer diameter at rim 102. The cap 101 separates a stub shaft 112, an inner race, a cage and balls (known as the internal joint components and collectively identified by reference number 108) from a tubular portion 111 of the propeller shaft. The stub shaft 112 and the outer race 109 are sealed via a dust boot 113 to prevent contamination. Air is allowed to pass from the internal components 108 of the CVJ to the central one of the hollow channels 103 through the vent hole 105 which is centrally located in the cap 101 and extends axially through a face of the cap 101 into the hollow channel 103.

The vent hole 105 is located on a major face of the cap 101 oriented to face the internal CVJ components 108. Air is then allowed to pass from the central hollow channel 103 of the cap 101 through the radially open ends of the hollow channel 103 into the radial annular groove 104 that runs 360 degrees around the outer periphery of the cap 101. The air then passes through bores 117 drilled into the outer race 109 of the CVJ to the atmosphere.

The hollow air channels 103 in the cap 101 have a cavity volume which ensures that the propeller shaft CVJ does not allow water ingress during an event in which the CVJ is hot and then cooled quickly, for example by water submersion. In such a situation, the rapid quenching can cause water to be sucked into the cap 101. By providing sufficient volume in the internal hollow channels 103 of the cap 101, the sucked-in water will be retained in the hollow channels 103 and will not reach the internal joint components 108 through vent hole 105. The exact volume of the hollow channels 103 depends on anticipated temperature differences and on physical properties of the propeller shaft assembly, such as enclosed air volume.

The central location of vent hole 105 ensures that the vent hole 105 is never at the bottom of the hollow channels 103, regardless of the angular orientation of the cap 101 inside the propeller shaft assembly. Therefore, water accumulated at the bottom of the hollow channels 103, even in the central hollow channel 103, cannot flow into the area of the internal joint components 8.

The tubular shaft 111 of the propeller shaft assembly is connected to the outer race 109 via a weld 110. The weld 110 of the type shown has an interior bead that would require machining to remove. In order to still allow for a telescopic collapse during a frontal impact without interior machining of the weld 110, the cap 101 is configured to withstand axial forces from the internal joint components 108 in direction 114 only to a limited extent. Upon a vehicle crash exceeding such limited force, the rim 102 of the cap 101 is retained inside the CVJ outer race 109. The central portion 106 of the cap 101 gives way, separates from the rim 102, and allows the internal joint components 108 to escape from the outer race 109 into the tubular propeller shaft 111. The rim 102 is configured to break into pieces at the time of separation from the central portion 106. The pieces of the rim 102 are small enough to disperse into the tubular propeller shaft 111 without impeding the telescopic movement of the internal joint components 108 into the tubular propeller shaft 111.

The cap 101 is made of a material, for instance a suitable plastic material, that is tunable to collapse at a certain energy produced by the vehicle during a crash. The exact energy and resulting force to trigger a separation of the central portion 106 from the rim 102 or to break the rim 102 can be empirically determined and depends on several factors that may include vehicle weight and spatial dimensions inside the vehicle. The dimensions of the webs 115 can be utilized for fine-tuning the cap properties to given demands, for instance by model simulations or by experimentation.

The cap 101 may be used in a CVJ outer race 109 that is joined to a tubular propeller shaft 111 by welding. When the joining method is friction welding, during a collision the grease retention and vent cap 101 contacts the weld 110 and collapses as illustrated in FIGS. 11 and 12. Upon a frontal impact, the walls 107 may collapse when the cap 101 first abuts the interior bead of the weld 110 as illustrated in FIG. 11. This collapse leaves the webbed axial surface of the cap 101 intact. Once the rim 102 reaches the weld, it may either be retained as shown in the embodiment of FIGS. 1 through 5, or it may break into pieces that may disperse inside the tubular propeller shaft 111 as illustrated in FIG. 12. In FIG. 12, the stub shaft 112 has been pushed so far into the tubular shaft 111 that the dust boot 113 is torn. The rim 102 of the cap 101 is destroyed and broken into many small pieces dispersed in the tubular shaft 111. The pieces are small enough not to impede the movement of the internal joint components 108.

Figure 13:
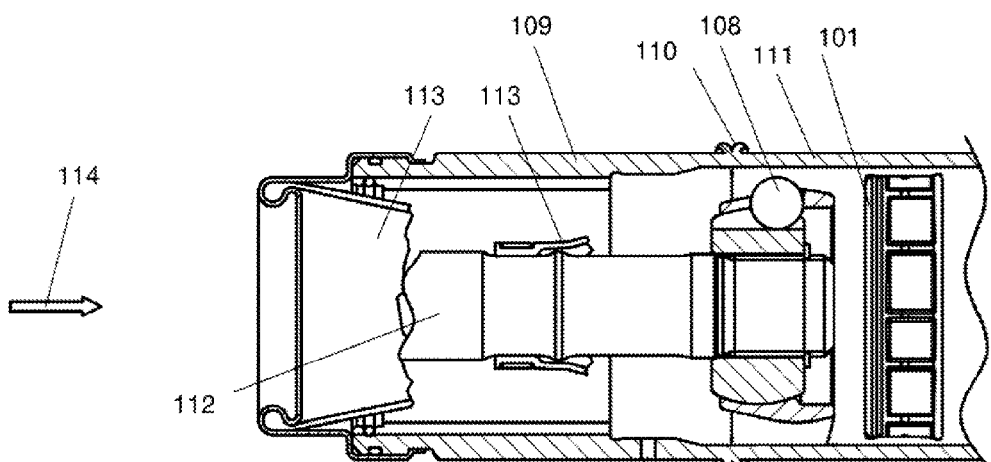
FIG. 13 depicts the grease retention and vent cap of FIG. 6 within a second propeller shaft system after a vehicle crash.

If the CVJ and tubular propeller shaft 111 are fabricated by a process other than friction welding, such as a magnetic arc welding or gas metal arc welding, no interior bead is created. In this approach, the cap 101 may be small enough to pass through the connection between the CVJ and the tubular propeller 111 shaft into the tubular propeller shaft 111 during a collision, without breaking the cap as shown in FIG. 13.

The caps 1 and 101 are dimensioned to be sufficiently robust to withstand general handling and operation during normal use over the entire lifetime of a propeller shaft.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A constant-velocity joint assembly for a propeller shaft assembly of the type having a tubular shaft connected to a constant velocity joint with an outer race and internal joint components, the constant-velocity joint assembly comprising the constant velocity joint and a grease retention and vent cap arranged in an inside diameter portion of the outer race, the cap including:
   an outer, substantially circular rim,
   a central portion having a hollow air chamber cavity extending radially across the cap from a first location of the rim to another location of the rim opposite the first location,
   an axial hole leading from the air chamber to the outside of the cap; and
   a radial annular groove communicating with the air chamber.

2. The constant-velocity joint assembly according to claim 1 further comprising the tubular shaft connected to the constant velocity joint, wherein the cap, during a vehicle crash, allows internal components of the constant velocity joint to escape the outer race and be propelled through the tubular shaft.

3. The constant-velocity joint assembly according to claim 2, wherein the tubular shaft and the constant velocity joint are connected by a method leaving an interior bead in an area where the tubular shaft and the constant velocity joint are connected, further comprising that the cap is configured to break when a force pressing the cap against the interior bead exceeds a predetermined threshold.

4. The constant-velocity joint assembly according to claim 3, further comprising that, upon exceeding the predetermined threshold, the rim is configured to be retained by the interior bead while the central portion of the cap is configured to separate from the bead and to move ahead of the internal joint components into the tubular shaft.

5. The constant-velocity joint assembly according to claim 2, wherein the tubular shaft and the constant velocity joint are connected in a connection area where the tubular shaft and the constant velocity joint are connected, further comprising that the cap is configured to remain intact and to move ahead of the internal joint components into the tubular shaft when a force pressing the cap against the connection area exceeds a predetermined threshold.

6. The constant-velocity joint assembly according to claim 1, wherein the axial hole is placed in a radially central location of the cap in a major face of the cap configured to face the internal joint components.

7. The constant-velocity joint assembly according to claim 1, further comprising that the hollow chamber is divided into hollow channels by a plurality of substantially parallel walls extending across the cap, each of the hollow channels being in communication with the radial annular groove and the radial annular groove extending through ends of the walls in the vicinity of the rim.

8. The constant-velocity joint assembly according to claim 7, further comprising that the parallel walls are arranged with respect to the axial hole in such a manner that the axial hole enters the hollow chamber between two walls.

9. The constant-velocity joint assembly according to claim 1, wherein the rim retains grease in the area of the internal joint components.

10. The constant velocity joint assembly according to claim 1, further comprising that the rim has a circumferential profile shaped complementary to an interior circumferential profile of the outer race of the constant velocity joint, the circumferential profile dimensioned to hold the cap unmoved until an axial force acting on the cap exceeds a predetermined threshold.

* * * * *